US011019704B2

(12) United States Patent
Patel et al.

(10) Patent No.: US 11,019,704 B2
(45) Date of Patent: May 25, 2021

(54) UNIVERSAL SENSOR INTERFACE SYSTEM FOR LUMINAIRES

(71) Applicant: SIGNIFY HOLDING B.V., Eindhoven (NL)

(72) Inventors: Vrajesh Upendrabhai Patel, Tucker, GA (US); Leonardo Enrique Matute, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 15 days.

(21) Appl. No.: 16/404,426

(22) Filed: May 6, 2019

(65) Prior Publication Data

US 2019/0342976 A1 Nov. 7, 2019

Related U.S. Application Data

(60) Provisional application No. 62/668,086, filed on May 7, 2018.

(51) Int. Cl.
*F21V 23/04* (2006.01)
*F21V 15/01* (2006.01)
(Continued)

(52) U.S. Cl.
CPC .......... *H05B 47/105* (2020.01); *F21V 15/01* (2013.01); *G01D 11/245* (2013.01); *H02J 50/10* (2016.02); *H05B 47/18* (2020.01)

(58) Field of Classification Search
CPC ..... G01D 11/245; F21V 15/01; F21V 23/003; F21V 23/045; F21K 9/278
See application file for complete search history.

(56) References Cited

U.S. PATENT DOCUMENTS 10,125,961 B2 * 11/2018 Slosberg ................. F21V 17/02
10,634,332 B2 * 4/2020 Draaijer .................. F21S 8/086
(Continued)

FOREIGN PATENT DOCUMENTS

EP 3133904 2/2017
WO WO 2016/134992 9/2016

OTHER PUBLICATIONS

International search report for PCT/EP2019/025139, dated Jun. 25, 2019.

*Primary Examiner* — An T Luu
(74) *Attorney, Agent, or Firm* — Meenakshy Chakravorty

(57) ABSTRACT

A universal sensor interface system for a luminaire includes a sensor receiving cavity that is formed in the luminaire and defined by a sensor receiving receptacle. Further, the universal sensor interface system includes a sensor device that is configured to be removably coupled to the sensor receiving receptacle of the luminaire and disposed in the sensor receiving cavity. The sensor device receives electrical energy from the luminaire and establishes data communication with the luminaire when the sensor device is disposed in the sensor receiving cavity. The transfer of electrical energy and data communication between the luminaire and the sensor device are enabled either wirelessly or using connector systems such as a pogo connector system. The luminaire includes a translation engine that is configured to transform data received from the sensor device to a format that is compatible with the luminaire and/or a light control system of the luminaire and vice-versa.

20 Claims, 4 Drawing Sheets

(51) Int. Cl.
  *H05B 47/18*   (2020.01)
  *H05B 47/105*  (2020.01)
  *H02J 50/10*   (2016.01)
  *G01D 11/24*   (2006.01)

(56) References Cited

U.S. PATENT DOCUMENTS

2008/0136334 A1   6/2008  Robinson et al.
2018/0035517 A1*  2/2018  Den Boer .............. H05B 47/22

* cited by examiner

UNIVERSAL SENSOR INTERFACE SYSTEM FOR LUMINAIRES

RELATED APPLICATIONS

The present application claims priority to U.S. Provisional Patent Application No. 62/668,086, filed May 7, 2018 and titled "Universal Sensor Interface System for Luminaires," the entire content of which is incorporated herein by reference.

TECHNICAL FIELD

Embodiments of the present disclosure relate generally to sensor systems, and more particularly to a universal sensor interface system for luminaires.

BACKGROUND

Most existing luminaires include one or more sensors installed therein to improve the efficiency of the luminaires and/or to make the luminaires smarter. For example, the sensors may be attached to the luminaires using fasteners. Further, said sensors may be connected to cables (e.g. RJ-11) in the luminaires to supply power to and/or enable data communication with the sensors. While the luminaires typically last for ten or more years, the rapid change in technology causes the sensors that are integrated into the luminaires to be outdated within a few years.

One method to upgrade an outdated sensor that is integrated into a luminaire may include replacing the entire luminaire with a new luminaire having a new sensor with upgraded technology. However, this method of replacing the entire luminaire may be inefficient considering that even though the integrated sensors may be outdated, the luminaire into which the sensors are integrated may still be operated for several years.

Another method to upgrade an outdated sensor that is integrated into a luminaire may include replacing only the outdated sensor without replacing the entire luminaire. However, the sensors that are integrated into the luminaires are not designed to be easily field replaceable by an end user. To meet existing safety standard requirements, licensed professionals may be required to remove an outdated sensor from a luminaire. Since the luminaires into which the sensors are integrated may not have built-in protection against electrical shock (e.g., in Class I luminaires), the licensed professional may have to cut off power supply to the luminaires prior to disassembling the luminaires for removing the sensor. Accordingly, the method of replacing only the outdated sensor without replacing the entire luminaire may be complicated, time consuming, and cost intensive.

Further, even if an outdated sensor that is integrated into a luminaire can be removed, the luminaire and/or a lighting control system to which the luminaire is connected may not be communicably compatible with the new sensor having the upgraded technology, thereby limiting the type of sensors that can be connected to and operated with the luminaires.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure relates to a universal sensor interface system. The universal sensor interface system includes a luminaire that comprises a sensor receiving cavity formed therein. Further, the universal sensor interface system includes a sensor device that is configured to be removably coupled to the luminaire and disposed in the sensor receiving cavity. The sensor device is configured to receive electrical energy from the luminaire and to establish data communication with the luminaire when the sensor device is disposed in the sensor receiving cavity.

In another aspect, the present disclosure is related to a luminaire. The luminaire includes a housing. Further, the luminaire includes a sensor receiving receptacle that is disposed in the housing. The sensor receiving receptacle defines a sensor receiving cavity that is configured to receive a sensor device therein and removably couple the sensor device to the luminaire. Furthermore, the luminaire includes a luminaire interface circuit. The luminaire interface circuit includes a power transfer unit that is configured to transfer electrical energy from the luminaire to the sensor device when the sensor device is removably coupled to the luminaire. Further, the luminaire interface circuit includes a data communication unit that is configured to enable data communication with the sensor device when the sensor device is removably coupled to the luminaire. Furthermore, the luminaire interface circuit includes a translator engine that is coupled to the data communication unit. The translator engine being configured to transform data received from the sensor device to a format that is compatible with the luminaire and/or a light control system of the luminaire and vice-versa. In one example embodiment, the luminaire comprises a magnetic layer disposed adjacent the sensor receiving cavity defined by the sensor receiving receptacle to magnetically couple the sensor device to the luminaire. In another example embodiment, the sensor receiving receptacle is configured to removably couple the sensor device to the luminaire using a mechanical coupling system that includes a snap tab system. In one example embodiment, the power transfer unit includes an inductive coil that is configured to wirelessly transfer the electrical energy from the luminaire to the sensor device through electromagnetic induction, and the data communication unit comprises a wireless transceiver that is configured to wirelessly communicate with the sensor device. In another example embodiment, the electrical energy is transferred from the luminaire to the sensor device and the data communication is established between the luminaire and the sensor device through a pogo connector system.

In yet another aspect, the present disclosure is related to a method that includes providing a luminaire that includes a sensor receiving receptacle that defines a sensor receiving cavity. Further, the method includes providing a sensor device that is configured to be removably coupled to the sensor receiving receptacle and to be disposed in the sensor receiving cavity. The sensor device is configured to receive electrical energy from the luminaire and to establish data communication with the luminaire when the sensor device is disposed in the sensor receiving cavity.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
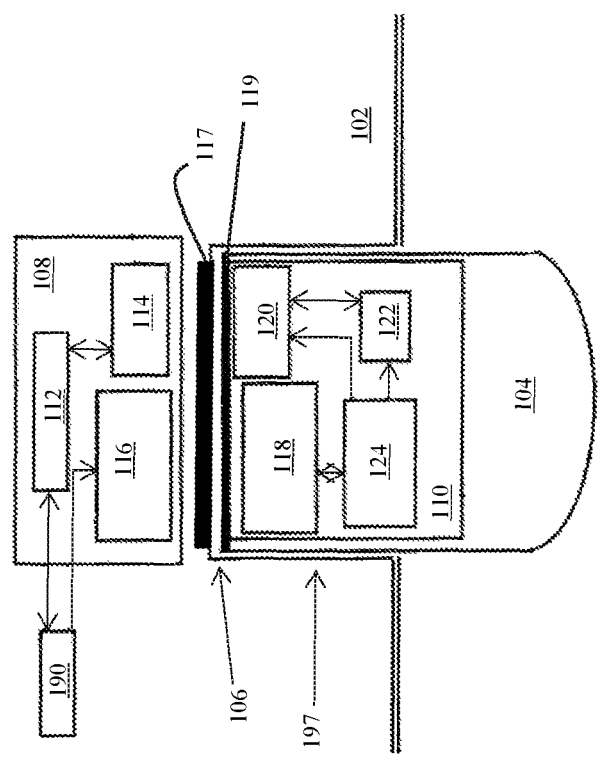
FIG. 1 illustrates an example universal sensor interface system, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis is instead placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes a universal sensor interface system for luminaires. The universal sensor interface system provides a modular sensor design that allows the sensors to be field installable, replaceable, and/or serviceable by an end user without the need for a licensed professional and/or the extensive efforts of disassembling the luminaire. In other words, the universal sensor interface system of the present disclosure allows an end user to replace a sensor that is coupled to a luminaire in a manner substantially similar to replacing a light bulb in a luminaire, i.e., without having to replace or disassemble the luminaire. Further, the universal sensor interface system of the present disclosure allows any appropriate sensor, i.e., both sensors that are communicably compatible and non-compatible with the luminaire or a lighting control system associated with the luminaire, to be coupled to and communicate with the luminaire.

The universal sensor interface system for luminaires may include a luminaire that has a sensor receiving cavity formed therein to lock and hold a sensor in position within the luminaire. The sensor may be locked and held in position within the sensor receiving cavity of the luminaire either magnetically or mechanically (e.g., push tabs, snap tabs, etc.), thereby making them easily installable and replaceable in the field. In other example embodiments, any other appropriate coupling mechanisms may be used to removably couple or releasably lock the sensor to the luminaire without departing from a broader scope of the present disclosure.

In one example, the luminaire may be configured to wirelessly transfer power to and enable wireless data communication with the sensor. In particular, the luminaire and the sensor may include inductive coils that may be configured to enable wireless power transfer from the luminaire to the sensor when the sensor is disposed in the sensor receiving cavity of the luminaire. Further, the luminaire and the sensor may include wireless transceivers, such as IR transceivers, or other low power wireless communication transceiver circuits for wireless data communication between the luminaire and the sensor when the sensor is disposed in the sensor receiving cavity of the luminaire.

In another example, the luminaire and the sensor may include a connector system, such as pogo connector system comprising pogo pins and the complementary pogo pin receiving receptacles (or other blind mating connector systems) that may be aligned and coupled when the sensor is disposed in the sensor receiving cavity of the luminaire. In said other example, the connector system may be configured to provide power from the luminaire to the sensor and enable data communication between the luminaire and the sensor.

The sensor may be configured to communicate using UART serial communication via either the wireless transceivers or the connector system. The luminaire may include a translator engine that is configured to translate a format of the data received from the sensor to a format that is compatible with the luminaire and/or a lighting control system associated with the luminaire such as, but not limited to, DALI, RF485, Synergy etc. The translation engine allows sensors that are communicably non-compatible with the luminaire or the lighting control system associated with the luminaire to be coupled to and communicate with the luminaire.

Figure 2:
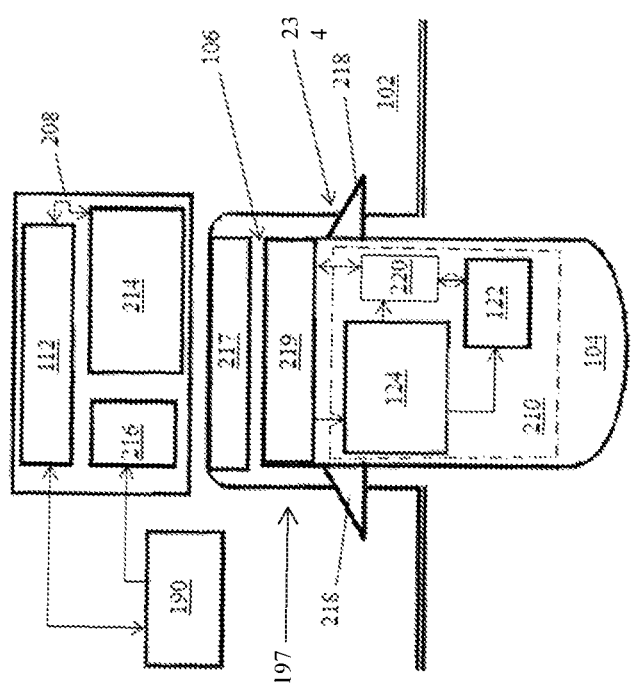
FIG. 2 illustrates another example universal sensor interface system, in accordance with example embodiments of the present disclosure.

Referring to FIGS. 1-2, the universal sensor interface system may include a luminaire 102 having a sensor receiving cavity 106 formed therein. Further, the universal sensor interface may include a sensor device 104 that is configured to be removably coupled to the luminaire 102 and securely held in the sensor receiving cavity 106 of the luminaire 102. The sensor device 104 may be a standalone device and may include, but is not limited to, a daylight sensor, an occupancy sensor, a motion sensor, a camera, a vibration sensor, a microphone, etc. The sensor receiving cavity 106 may be formed in a housing of the luminaire 102 or any other appropriate portion of the luminaire that may be easily accessible to an end user. For example, the sensor receiving cavity 106 may be formed at the bottom portion of the housing, i.e., a portion of the housing facing an area to be illuminated when the luminaire is installed in a mounting surface, such that the sensor receiving cavity 106 and a sensor device 104 disposed therein may be easily accessible to a user from below. In one example, the sensor receiving cavity 106 may be defined by a sensor receiving receptacle 197 that may be coupled to the luminaire 102. However, in other examples, the receptacle can be omitted and the sensor receiving cavity 106 may be built into the luminaire 102. Further, in some example embodiments, the luminaire 102 may include more than one sensor receiving cavity 106 configured to receive sensor devices 104 therein.

A sensor device 104 may be held in place within the sensor receiving cavity 106 of the luminaire 102 using any appropriate coupling mechanisms that allow the sensor device 106 to be easily field installable, replaceable, and/or serviceable by an end user without the need to disassemble the luminaire 102. In one example, the sensor device 104 may be magnetically coupled to and disposed in the sensor receiving cavity 106 of the luminaire 102 as illustrated in FIG. 1. In another example, the sensor device 104 may be coupled to and disposed in the sensor receiving cavity 106 of the luminaire 102 using a tab and slot mechanism as illustrated in FIG. 2. In yet another example, the sensor receiving cavity 106 may include threads formed on an inner surface, the threads being configured to receive complementary threads on the sensor device 104 to couple the sensor device 104 to the luminaire 102. One of skill in the art can understand and appreciate that the above-mentioned examples for removably coupling the sensor device 104 to the luminaire 102 are not limiting and other appropriate coupling mechanisms are within the broader scope of the present disclosure.

The coupling mechanism used to dispose and securely hold the sensor device 104 in the sensor receiving cavity 106 of the luminaire 102 may be a blind mating system where the sensor device 104 is removably coupled to the luminaire 102 using sliding, snapping, or any other appropriate action which can be accomplished without wrenches or other tools. In other words, the universal sensor interface system may be configured as a plug and play system where the sensor device 104 can be easily plugged in and out of the sensor receiving cavity 106 of the luminaire 102 which in turn allows easy field installation, replacement, and serviceability without having to disassemble the luminaire 102. Further, the luminaire 102 may be devised as a Class II luminaire that has an in-built protection against electrical shock, thereby eliminating the need for a licensed professional to install and/or replace the sensor device 104 in the luminaire 102. In other words, the universal sensor interface system of the present disclosure allows an end user to easily install and/or replace the sensor device 104 in the luminaire 102.

The universal sensor interface system may be configured such that when the sensor device 104 is disposed in the sensor receiving cavity 106 of the luminaire 102: (a) the luminaire 102 may supply power to the sensor device 104, and (b) data communication between the luminaire 102 and the sensor device 104 may be enabled. In view of the end user safety, the sensor device 104 may be designed without any exposed wires that are to be connected to the luminaire for data communication with the luminaire 102 and/or receiving power from the luminaire 102. Instead, both the power supply to the sensor device 104 and data communication between the sensor device 104 and the luminaire 102 may be enabled either wirelessly or using connector systems such as a pogo connector system. It is noted that pogo connector systems represent one example type of connector system. That is, in other example embodiments, the universal sensor interface system (e.g., the luminaire and the sensor device) can include any other appropriate connector system that is configured to enable power transfer and communication between the luminaire 102 and the sensor device 104 of the universal sensor interface system.

Referring to FIG. 1, in one example embodiment, the luminaire 102 may include one or more magnets or a magnetic layer 117 that is disposed therein and adjacent the sensor receiving cavity 106 to magnetically and removably couple the sensor device 104 to the luminaire 102. The sensor device 104 may include a plurality of complementary magnets or a complementary magnetic layer 119 as illustrated in FIG. 1. In some examples, the portion of the luminaire 102 that defines the sensor receiving cavity 106 and a housing of the sensor device 104 may be formed using complementary magnetic material such that when sensor device 104 is disposed in the sensor receiving cavity 106, the sensor device 104 is magnetically and removably coupled to the luminaire 102. Even though FIG. 1 illustrates an example embodiment of the universal sensor interface system where the sensor device 104 is magnetically coupled to the luminaire 102, one of skill in the art can understand and appreciate that any other appropriate coupling mechanisms can be used to removably couple the sensor device 104 to the luminaire 102. For example, as illustrated in FIG. 2, the sensor device 104 may be coupled to the luminaire 102 using a twist lock or mechanical coupling mechanism such as a set of snap fit tabs 218 (e.g., snap tabs) formed on the sensor device 104 that may engage with or snap into corresponding slots 234 formed in a portion of the luminaire 102 that defines the sensor receiving cavity 106. In another example embodiment, the snap tabs 218 may be formed in a portion of the luminaire housing that defines the sensor receiving cavity 106 and the slots 234 may be formed in the sensor device 104. The coupling mechanisms that are used to removably couple the sensor device 104 to the luminaire 104 may be blind coupling mechanisms that allow an easy installation and replacement of the sensor device 104 for the user.

Further, the luminaire 102 may include a luminaire interface circuit 108 and a driver 190 that may be electrically and communicably coupled to the luminaire interface circuit 108. The luminaire interface circuit 108 may include a wireless power transfer system 116, a wireless transceiver 114, and a translator engine 112. The wireless power transfer system 116 of the luminaire 102 may receive electric power from the driver 190 or from any other appropriate power source. In particular, the wireless power transfer system 116 may be configured to wirelessly transfer electric power (or energy) to the sensor device 104 via the corresponding wireless power transfer system 118 of the sensor device 104. The electric power that is received at the sensor device 104 may be 9-12 volt electric power and the components of the sensor device 104 may be configured to operate at 1-3 volt. Accordingly, the electric power that the wireless power transfer system 118 of the sensor device 104 receives from the luminaire 102 may be conditioned by the power conditioning circuit 124 of the sensor device 104. The power conditioning circuit 124 may include a DC-DC converter that is configured to step down the voltage of the received electric power to an operational voltage of the sensor device 104. The stepped down or conditioned electric power may be used to power the sensor circuit 122 and the wireless transceiver 120 of the sensor interface circuit 110 of the sensor device 104.

In one example, the wireless power transfer system (116, 118) in the luminaire 102 and the sensor device 104 may include inductive coils that are configured to inductively and wirelessly transfer electric power from the luminaire 102 to the sensor 104. However, in other example embodiments, electric power may be wirelessly transferred from the luminaire 102 to the sensor 104 using any other appropriate wireless power transfer mechanism without departing from a broader scope of the present disclosure. In yet another example, the sensor device 104 may be a self-contained unit in that the sensor device 104 may not rely on the luminaire 102 for receiving electric power for operation of the sensor device 104. Instead, the sensor device 104 may include batteries or the sensor device 104 may be configured to be powered by alternative energy sources. In some other example embodiments, the luminaire 102 and the sensor device 104 may include any other appropriate power transfer units, i.e., other than the wireless power transfer system 116 and the power supply circuit 216.

The wireless transceivers 114 and 120 of the luminaire 102 and the sensor device 104, respectively, may be configured to enable wireless data transfer between the luminaire 102 and the sensor 104 when the sensor device 104 is disposed in the sensor receiving cavity 106 of the luminaire 102. In one example, the wireless transceivers (114, 120) may be IR transceivers. In said example embodiment where the wireless transceivers (114, 120) are IR transceivers, the wireless transceivers (114, 120) in the sensor device 104 and the luminaire 102 may need a line of sight alignment to ensure uninterrupted and reliable data communication between the sensor device 104 and the luminaire 102. In one example embodiment, the coupling mechanism that may be used to removably couple the sensor device 104 to the luminaire 102 may also be configured to appropriately align the wireless transceivers (114, 120). For example, a poke yoke system may be used to appropriately align the sensor device 104 within the sensor receiving cavity 106 of the luminaire 102. However, in other example embodiments, an appropriate alignment mechanism that is separate from the coupling mechanism may be used to align the wireless transceivers (114, 120).

Even though the present disclosure describes the wireless transceivers (114, 120) as being IR transceivers, one of skill in the art can understand and appreciate that in other example embodiments, the wireless transceivers (114, 120) can include any other appropriate transceivers that enable wireless data communication between the sensor device 104 and the luminaire 102 without departing from a broader scope of the present disclosure. For example, the wireless transceivers (114, 120) may be Bluetooth transceivers or Zigbee transceivers which do not require a line of sight alignment.

Further, even though FIG. 1 illustrates wireless transceivers (114, 120) being used for data communication between the sensor device 104 and the luminaire 102 and wireless power transfer systems being used for wireless transfer of electric power to the sensor device 104, one of skill in the art can understand and appreciate that in other example embodiments, any other communication mechanisms or power transfer mechanisms may be used without departing from a broader scope of the present disclosure. For example, as illustrated in FIG. 2, the wireless power transfer systems (116, 118) and the wireless transceivers (114, 120) may be replaced by connector systems, such as a pogo connector system. In one example, the luminaire 102 may include spring loaded pogo pins 217 that are disposed in the sensor receiving cavity 106. Similarly, in said example, the sensor device 104 may include pogo pin receptacles 219 that are formed therein to receive the pogo pins of the luminaire 102 when the sensor device 104 is coupled to the luminaire 102. In said example, once the pogo pin based connection is established between the luminaire 102 and the sensor device 104, electric power may be transferred from the luminaire 102 to the sensor device 104 and data communication may be enabled between the luminaire 102 to the sensor device 104 via the pogo pin based connection. In particular, once the pogo pin based connection is established, electric power from the power supply circuit 216 may be transferred to the sensor device 104. Responsively, the power conditioning circuit 124 of the sensor device 104 conditions the received electrical power for supplying operational power to the data communication circuit 220 and the sensor circuit 122 of the sensor interface circuit 210 of the sensor device 104. In some examples, the pogo pins may be disposed in the sensor device 104 and the corresponding pogo pin receptacle may be disposed in sensor receiving receptacle 197 that defines the sensor receiving cavity 106 of the luminaire 102 without departing from a broader scope of the present disclosure.

The sensor circuit 122 of the sensor device 104 may be associated with data collection and sensing operations of the sensor device 104, e.g., detecting motion, detecting occupancy, measuring daylight, etc. The data that is collected by the sensor device 104 may be transmitted from the sensor circuit 122 to a data communication unit of the sensor device 104, i.e., the wireless transceiver 120 or the data communication circuit 220. Responsively, the data communication unit of the sensor device 104, i.e., the wireless transceiver 120 or the data communication circuit 220 may communicate the data to the data communication circuit of the luminaire 102, i.e., the wireless transceiver 114 or the data communication circuit 214 via a wireless link or through the connector system (217, 219).

In an example embodiment, the data communication between the sensor device 104 and the luminaire 102 may be a serial communication. Accordingly, the sensor device 104 may be designed as a universal Asynchronous Receiver/Transmitter (UART) communication device or as a device with a UART data interface. The data that is transmitted from the sensor device 104 to the luminaire 102 in the form of a serial communication may be forwarded to the translator engine 112 of the luminaire 102. The translator engine 112 may translate the data from the sensor device 104 that is in the serial communication format to a format that is compatible with the luminaire 102 and/or a lighting control system associated with the luminaire 102, such as, but not limited to, 0-10V, $I^2C$, Fifth Light, Digital Addressable Lighting Interface (DALI), etc.

Figure 3:
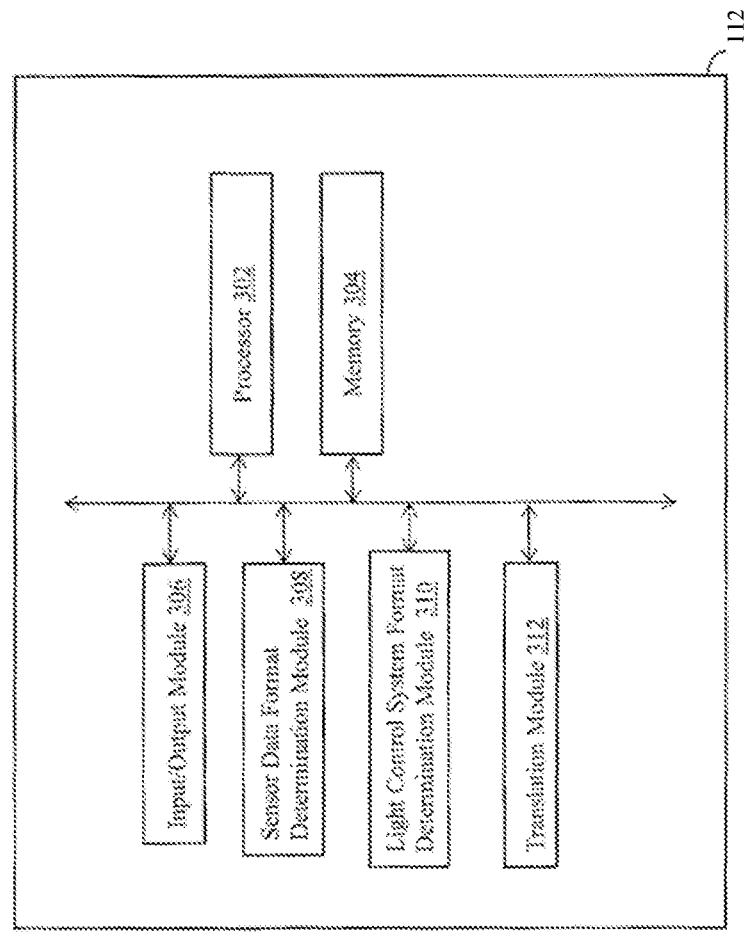
FIG. 3 illustrates a block diagram of the translator engine of a luminaire interface circuit of the universal sensor interface system of FIGS. 1 and 2, in accordance with example embodiments of the present disclosure.

In particular, as illustrated in FIG. 3, the translator engine 112 may include an input/output module 306, a sensor data format determination module 308, a light control system format determination module 310, a translation module 312, a processor 302, and a memory 304. The processor 302 of the translator engine 112 may be a multi-core processor or a combination of multiple single core processors. Further, the translator engine 112 may include a memory 304 that is coupled to the processor 302. The memory 304 may be non-transitory storage medium, in one embodiment, and a transitory storage medium in another embodiment. The memory 304 may include instructions that may be executed by the processor 302 to perform operations of the translator engine 112. In other words, operations associated with the different modules 306-312 may be executed using the processor 302.

The input/output module 306 may be configured to receive data from and transmit data to the driver 190 and/or the wireless transceiver 114 (or the data communication module 214). Accordingly, data that is received from the sensor device 104 may be transmitted to the input/output module 306 by the wireless transceiver 114 or the data communication module 214 of the luminaire 102. Responsively, the input/output module 306 may communicate and operate in concert with the sensor data format determination module 308 (herein 'sensor format module 308') to determine the format of the data received from the sensor device 104. Then, sensor format module 308 operates in concert with the light control system format module 310 (herein 'light control format module 310') and the translation module 312 to determine the data format that is compatible with the luminaire 102 or the lighting control system associated with the luminaire 102 and transform the data received from the sensor device 104 to the data format that is compatible with the luminaire 102 or the lighting control system. Responsively, the data that is in the format that is compatible with the luminaire 102 or the lighting control system is transmitted to the driver 190 or any other appropriate component of the luminaire 102. Similarly, the translator engine 112 may be configured to transform data from the luminaire or the lighting control system to a format that is compatible with the sensor device 104 (e.g., UART—serial communication data format) prior to transmitting the data to the sensor device 104.

Figure 4:
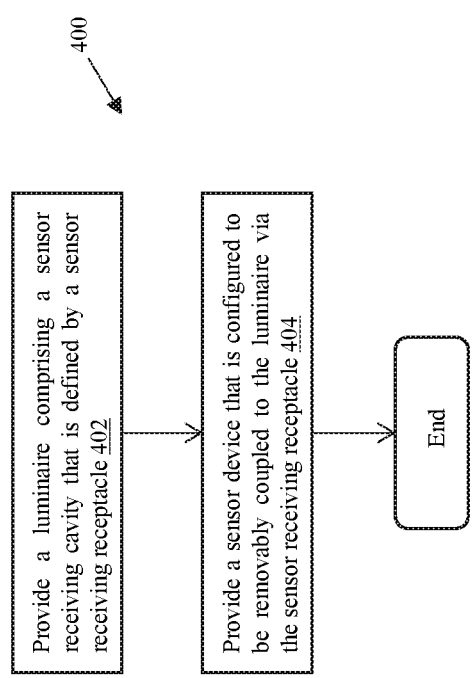
FIG. 4 illustrates a method associated with the universal sensor interface system, in accordance with example embodiments of the present disclosure.

Turning to FIG. 4, a method 400 associated with the universal interface sensor system includes step 402 of providing the luminaire 102 that includes the sensor receiving receptacle 234 that defines a sensor receiving cavity 106.

Further, the method includes step 404 of providing the sensor device 104 that is configured to be removably coupled to the sensor receiving receptacle 234 and to be disposed in the sensor receiving cavity 106 such that when the sensor device 104 is disposed in the sensor receiving cavity 106, the sensor device 104 is configured to receive electrical energy from the luminaire 102 and to establish data communication with the luminaire 102. In one example embodiment, as described above, the sensor device 104 is magnetically coupled to the luminaire 102, and the electrical energy is wirelessly transferred from the luminaire 102 to the sensor device 104 through electromagnetic induction. In another example embodiment, as described above, the electrical energy is transferred from the luminaire 102 to the sensor device 104 and the data communication is established between the luminaire 102 and the sensor device 104 through a pogo connector system (217, 219).

Although example embodiments are described herein, it should be appreciated by those skilled in the art that various modifications are well within the scope of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

Although the present embodiments have been described with reference to specific example embodiments, it will be evident that various modifications and changes may be made to these embodiments without departing from the broader scope of the various embodiments. For example, the various devices, engines, and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A universal sensor interface system comprising:
a luminaire that comprises a sensor receiving cavity formed therein, and
a sensor device that is configured to be removably coupled to the luminaire and disposed in the sensor receiving cavity,
wherein the sensor device is configured to receive electrical energy from the luminaire and to establish data communication with the luminaire when the sensor device is disposed in the sensor receiving cavity,
wherein the luminaire further comprises:
a luminaire interface circuit comprising:
a first induction coil,
a first wireless transceiver, and
a translator engine that is coupled to the first wireless transceiver.

2. The universal sensor interface system of claim 1, wherein the sensor device is magnetically coupled to the luminaire.

3. The universal sensor interface system of claim 1, wherein the sensor device is coupled to the luminaire using a push tab system.

4. The universal sensor interface system of claim 1, wherein the electrical energy is wirelessly transferred from the luminaire to the sensor device through electromagnetic induction.

5. The universal sensor interface system of claim 1, wherein the electrical energy is transferred from the luminaire to the sensor device and the data communication is established between the luminaire and the sensor device through a pogo connector system.

6. The universal sensor interface system of claim 1:
wherein the sensor device comprises:
a sensor interface circuit comprising:
a second induction coil, and
a second wireless transceiver.

7. The universal sensor interface system of claim 6, wherein the translator engine is configured to transform data received from the sensor device to a format that is compatible with the luminaire.

8. The universal sensor interface system of claim 1, wherein the sensor receiving cavity is defined by a sensor receiving receptacle that is disposed in an opening in a housing of the luminaire.

9. The universal sensor interface system of claim 6, wherein the sensor interface circuit further comprises a power conditioning circuit that is configured to step down the electrical energy received from the luminaire to an operational voltage that is compatible with the sensor device.

10. The universal sensor interface system of claim 7, wherein the data received from the sensor device is in a serial communication data format.

11. The universal sensor interface system of claim 10, wherein the serial communication data format is a Universal Asynchronous Receiver/Transmitter (UART) data format.

12. The universal sensor interface system of claim 7, wherein the format of the data that is compatible with the luminaire comprises one of 0-10V data format, $I^2C$ data format, Fifth Light data format, and Digital Addressable Lighting Interface (DALI) data format.

13. A luminaire comprising:
a housing;
a sensor receiving receptacle that is disposed in the housing, the sensor receiving receptacle defining a sensor receiving cavity that is configured to receive a sensor device therein and removably couple the sensor device to the luminaire; and a luminaire interface circuit comprising:
- a power transfer unit that is configured to transfer electrical energy from the luminaire to the sensor device when the sensor device is removably coupled to the luminaire;
- a data communication unit that is configured to enable data communication with the sensor device when the sensor device is removably coupled to the luminaire; and
- a translator engine that is coupled to the data communication unit, the translator engine being configured to transform data received from the sensor device to a format that is compatible with the luminaire.

14. The luminaire of claim 13, wherein the luminaire comprises a magnet disposed adjacent the sensor receiving cavity defined by the sensor receiving receptacle to magnetically couple the sensor device to the luminaire.

15. The luminaire of claim 13, wherein the sensor receiving receptacle is configured to removably couple the sensor device to the luminaire using a mechanical coupling system, and wherein the mechanical coupling system comprises a snap tab system.

16. The luminaire of claim 13, wherein the power transfer unit comprises an inductive coil that is configured to wirelessly transfer the electrical energy from the luminaire to the sensor device through electromagnetic induction, and wherein the data communication unit comprises a wireless transceiver that is configured to wirelessly communicate with the sensor device.

17. The luminaire of claim 13, wherein the electrical energy is transferred from the luminaire to the sensor device and the data communication is established between the luminaire and the sensor device through a pogo connector system.

18. A method comprising:
providing a luminaire comprising a sensor receiving receptacle that defines a sensor receiving cavity; and
providing a sensor device that is configured to be removably coupled to the sensor receiving receptacle and to be disposed in the sensor receiving cavity,
wherein the sensor device is configured to receive electrical energy from the luminaire and to establish data communication with the luminaire when the sensor device is disposed in the sensor receiving cavity,
wherein the luminaire further comprises:
a luminaire interface circuit comprising:
a first induction coil,
a first wireless transceiver, and
a translator engine that is coupled to the first wireless transceiver.

19. The method of claim 18, wherein the sensor device is magnetically coupled to the luminaire, and wherein the electrical energy is wirelessly transferred from the luminaire to the sensor device through electromagnetic induction.

20. The method of claim 18, wherein the electrical energy is transferred from the luminaire to the sensor device and the data communication is established between the luminaire and the sensor device through a pogo connector system.

* * * * *